United States Patent [19]
Tanabe et al.

[11] 3,967,025
[45] June 29, 1976

[54] MAGNETIC RECORDING MATERIAL

[75] Inventors: Takashi Tanabe; Tomio Adachi, both of Sagamihara, Japan

[73] Assignee: Teijin Limited, Osaka, Japan

[22] Filed: June 28, 1974

[21] Appl. No.: 484,152

Related U.S. Application Data

[63] Continuation of Ser. No. 300,174, Oct. 24, 1974, abandoned.

[30] Foreign Application Priority Data

Oct. 27, 1971  Japan .............................. 46-84663

[52] U.S. Cl. .............................. 428/155; 360/134; 427/129; 427/172; 427/173; 427/304; 427/315; 427/316; 427/322; 428/212; 428/329; 428/333; 428/334; 428/339; 428/458; 428/474; 428/480; 428/523; 428/900

[51] Int. Cl.² .................. G11B 5/70; G11B 5/78; G11B 5/84

[58] Field of Search ............ 117/7, 47 A, 235–240; 161/117, 164; 360/134; 427/129; 428/155, 900

[56] References Cited

UNITED STATES PATENTS

| | | | |
|---|---|---|---|
| 2,336,384 | 12/1943 | Baker et al. | 161/164 |
| 2,448,316 | 8/1948 | Lesavoy | 161/117 |
| 3,293,066 | 12/1966 | Haines | 117/240 |
| 3,397,072 | 8/1968 | Alles | 117/236 |
| 3,400,041 | 9/1968 | Rasmussen | 161/117 |
| 3,734,772 | 5/1973 | Schnell et al. | 117/235 |

Primary Examiner—J.C. Cannon
Attorney, Agent, or Firm—Sherman & Shalloway

[57] ABSTRACT

A magnetic recording material formed from a base film of a crystalline polymer and having a magnetic layer coated on one surface of the base film which is sufficiently smooth to prevent the occurrence of dropout and the other surface of the film being finely rugged to thereby impart good running property to the magnetic recording material.

6 Claims, 3 Drawing Figures

Fig. 1-a
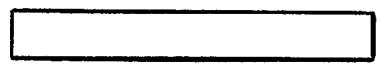
Fig. 1-b
Fig. 1-c

MAGNETIC RECORDING MATERIAL

This is a continuation, of application Ser. No. 300,174, filed Oct. 24, 1974 and now abandoned.

This invention relates to a magnetic recording material and a method for its production.

Magnetic recording materials such as magnetic recording tapes or magnetic recording cards are generally prepared by coating a magnetic layer on one surface of a base film. One of the important properties required of this magnetic recording material is that it does not cause dropout of signals during recording and reproduction. When the polymeric base film is remarkably rugged, portions of the film remain uncoated with the magnetic layer, or the magnetic layer coating may contain portions which do not come into contact with the recording or reproducing head. Therefore, the recording or reproduction of signals fails at these portions. In order to obviate this disadvantage, the surface of the base film should be as flat and smooth as possible.

In recent years, it has been required that magnetic recording materials be extremely thin because of the need for increasing the amount of recording per unit volume. For this purpose, both the base film and the magnetic layer to be coated should be as thin as possible. With such a thin magnetic layer, even a slight asperity on the base film surface becomes a cause of the dropout. Therefore, there has been an increasing demand for the flatness and smoothness of very thin base films.

Needless to say, the surface of a polymeric film intended for use as a base film of magnetic material should be free from creases or cracks. The freedom from creases and cracks can be achieved by good slipperiness of the base film; in other words, the surface of the film should have a low coefficient of friction. Films of poor slipperiness frequently become useless as a base of magnetic recording material because injuries and creases tend to be formed on the surface in a step of winding up the film in roll form or a step of coating a magnetic layer on the film. If such a defective film is used as the base, magnetic recording material of good quality cannot be obtained in good yields. Slipperiness of the film is also required because the resulting magnetic recording material should travel smoothly when, for example, it is withdrawn from, or wound up on, a reel or casette.

A method has already been proposed for improving the slipperiness of film by incorporating inorganic fine particles in a polymer or forming the fine particles of an insoluble catalyst residue therein and fabricating such a polymer into films. Fine ruggedness is formed on the surface of the film by the presence of the fine particles, and therefore the slipperiness of the film is improved. It is the general practice to use such film of improved slipperiness as a base of magnetic recording material. However, the film so produced has both surfaces rugged, and even by slight agglomeration of the fine particles at the time of coating a magnetic layer, dropout tends to occur, and moreover, it is impossible to decrease the thickness of the magnetic layer.

It is an object of this invention to provide a magnetic recording material which has overcome these difficulties and solved the problems of dropout, yield, running property, etc.

In order to achieve the above object, the invention provides a method of producing a magnetic recording material which comprises preparing an unstretched film of a crystalline polymer, stretching it and coating a magnetic layer on one surface of the film, wherein the film is crystallized so that the degree of crystallization of one surface (surface A) of the film becomes at least 5 % higher than that of the other surface (surface B), then the film is stretched in at least one direction, and then a magnetic layer is coated on the other surface (surface B). The above-described differential crystallization is performed by heating only surface A (preferably with surface B being cooled), or causing a crystallization promoter to act only on surface A, or using both the above-mentioned heating technique and the crystallization promotor simultaneously.

By the above method of this invention, there is provided a magnetic recording material comprising a base film of a crystalline polymer and a magnetic layer coated on one surface of the base film, the surface of the base film on which the magnetic layer is coated being sufficiently flat and smooth to prevent the occurrence of dropout, the other surface of the film being finely rugged to impart good running property to the base film, wherein the base film does not containing fine particles in an amount to cause noticeable ruggedness to the film.

The invention will be described in greater detail below.

The critical feature of the method of this invention is that a film of a crystalline polymeric film, one surface of which has a degree of crystallization at least 5 % higher than that of the other surface, is stretched to cause fine ruggedness to the surface having a higher degree of crystallization and render the slipperiness of the film extremely good, and on the other hand, the surface of the film having a lower degree of crystallization is stretched in a usual manner and becomes smooth and flat, and on such a surface, a magnetic layer can be coated without any resulting defects and dropout can be prevented.

FIGS. 1a to 1c schematically show the state of stretching films of polyethylene terephthalate one surface of which is crystallized.

FIG. 1-a shows a sectional surface of an untreated film, and FIG. 1-b is a sectional surface of a film one surface (shown by hatchings) of which is crystallized (the degree of crystallization 26 %). When this film is stretched for example to 2.3 to 4.0 times the original length at 70°–120°C. both longitudinally and transversely, the crystallized part cannot be uniformly stretched, and fine ruggedness occur as shown in FIG. 1-c, whereby its slipperiness is improved remarkably. The other surface (having a degree of crystallization of 7 %) is stretched in a usual manner, and becomes smooth and flat. The dimensional stability of the stretched film can be improved by a known heat-setting treatment (for example at a temperature of 150°–230°C. in the case of polyethylene terephthalate film). This treatment results in a remarkable increase of the degree of crystallization of the entire film, and the entire film has substantially uniform degree of crystallization. The difference in degree of crystallization between the two surfaces is almost lost at this stage. However, the ruggedness of one surface and the smoothness of the other surface are not all affected by this heat-setting treatment.

With the film such as shown in FIG. 1-c, slipperiness between the rugged surfaces is of course good, but slipperiness between the rugged surface and the smooth surface is also sufficiently good. Therefore, the wind-up of the film can be performed without trouble. By coating a magnetic layer on the smooth surface of the film, the thickness becomes uniform and dropout does not occur. Even if the thickness of the magnetic layer is reduced, no trouble occurs.

Examples of the crystalline polymer used in this invention are aromatic linear polyesters such as polymethylene terephthalate, polymethylene-2,6-naphthalate or a copolyester composed predominantly of either of said polyesters and having crystallizability, polyamides such as nylon 6 or nylon 66, and polypropylene. The aromatic polyesters are especially preferred in view of the ease of controlling the crystallization of one surface of the film and the good characteristics of the film obtained.

Preferably, the polymer should not contain insoluble particles, but may contain finely divided inorganic particles or catalyst residue particles to an extent such as not to cause dropout. The film may be produced by a known method such as melt extrusion or casting. It is desirable that this film should be formed under conditions which result in a low degree of crystallization. This serves for the subsequent differential crystallization treatment.

Usually, the film is subjected to the differential crystallization treatment while the film is substantially in the unstretched state. After the differential crystallization treatment, the film may be drawn uniaxially or biaxially. The biaxial stretching may be performed consecutively or simultaneously in different directions. Alternatively, an undrawn film is stretched in one direction, subjected to the differential crystallization treatment, and then stretched in a direction at right angles to the direction of the first stretching. This method has the advantage that the rate of crystallization of the film is accelerated, and therefore, the treating time in the subsequent differential crystallization treatment can be shortened. In view of the fact that the shortening of the time required for the differential crystallization is the most important factor for dominating the speed of production in the continuous performance of the method of this invention, this method is a very desirable method.

The differential crystallization treatment in accordance with the method of this invention to increase the degree of crystallization of one surface of the film by at least 5 % higher than the other surface is carried out, for example, by the following two methods.

(1) One surface of the film is cooled (e.g. on a drum) and at the same time, the other surface is heated (e.g. by infrared rays, hot air or hot steam) to provide a temperature gradient in the thickness direction of the film, whereby only that surface of the film which has been heated at a higher temperature is crystallized.

(2) A substance having a crystallization promoting action is caused to act only on one surface of the film.

The crystallization promoter used in method (2) is well known in the art, and examples of this substance that can be used for the aromatic polyesters are as follows:

(A) non-polar liquids such as 1,4-dioxane, dichloromethane, 1,2-dibromoethane, methyl acrylate, toluene, benzene, monochlorobenzene, ethyl formate, isopropyl benzene, ethyl acetate, dimethyl o-phthalate, 1,2,4-trichlorobenzene, m-xylene, o-xylene, amyl acetate, butyl acetate, carbon disulfide, p-xylene, ethylbenzene or diethyl o-phthalate; (B) polar liquids such as benzyl formate, acetophenone, nitrobenzene, anisaldehyde, benzaldehyde, N,N-dimethyl aniline, N,N-dimethyl formamide, o-nitrobenzene, pyridiene, methyl benzoate, nitroethane, p-methyl acetophenone, methyl ethyl ketone, acrylic acid, dimethyl sulfoxide, nitromethane, acetaldehyde, acetone, acrylonitrile, cyclohexanone, 2-nitropropane, acetonitrile, isobutyraldehyde, acetic acid or formic acid; and (C) hydrogen-bonded liquids such as benzyl alcohol, isobutanol, ethylene glycol, 36 % formamide, isodecanol, isopropanol, 1-hexanol, thiodiethylene glycol, 2-ethyl-1-hexanol, cyclohexanol, 1-pentanol, methanol, ethanol, 1-butanol, 1,4-butanediol, 2-butanol, isopentanol or water.

Of these crystallization promotors, water is most preferred for its low cost and non-toxicity to man. Crystallization of only one surface of an undrawn film using water may be carried out, for example, by the following methods.

a. Applying boiling water or steam (including wet steam, saturated steam, superheated steam, or pressurized steam) to the surface of the moisture-free unstretched film whereby moisture absorption and heating are simultaneously performed and only the treated surface is crystallized.

b. Applying warm water, boiling water or steam to the surface of the moisture-free unstretched film to cause the film to absorp moisture, and then heat-treating the film thereby to crystallize only the treated surface. When water is used, the heat-treating temperature is preferably at least 80°C. but below the melting point of the film. The heat-treatment time should be longer than the induction period of crystallization of a part of the film which has a large moisture content, but shorter than the induction period of crystallization of a part of the film which has a small moisture content.

When the differential crystallization treatment is carried out using the crystallization promotor, the entire film or only one surface thereof to be treated may, if desired, be heated before, during or after the crystallization treatment. The crystallization treatment may be carried out at the time of forming the film. For example, a polymer is melt-extruded and quenched under a temperature gradient. The extent of crystallization in this one surface crystallization treatment can be controlled by varying the treatment temperature or treatment time or both.

The extent of the differential crystallization treatment in the present invention is determined according to the slipperiness and stretchability of the film. It is necessary that the degree of crystallization of the crystallized surface should be at least 5 % higher than that of the other surface. If this difference is smaller than 5 %, slipperiness does not become different between the two surfaces, as will be demonstrated by Examples which will appear later in the specification.

The thickness of a layer having a higher degree of crystallinity in the differential crystallization treatment is not critical, and it is sufficient that the thickness is about 10 micrometers in order to cause surface ruggedness by subsequent stretching. If the thickness of this layer becomes too large, it is difficult to stretch the film. Therefore, the thickness should be as small as possible within a range which causes surface ruggedness.

The coating of the magnetic layer on the heat-treated film may be carried out by a customary manner.

The magnetic recording material usually has a thickness of 3 to 100 μm. The thickness of the base film is 2 – 100 μm and the thickness of the coated magnetic layer is 1 – 20 μm.

The following Examples illustrate the invention.

The various properties of the magnetic recording material given in the Examples were determined as follows:

COEFFICIENT OF FRICTION

ASTM D-1891-63 (the tester used could not measure values above 4.0 because of scale out) Dropout The sample magnetic tape was video recorded, and dropout was detected. The number of dropouts that occurred because of the base film was counted, and expressed per 12.5 mm × 6 m.

OBSERVATION OF SURFACE

Observed with a reflection-type differential interference microscope.

DEGREE OF CRYSTALLINITY OF THE SURFACE LAYER

The film which was subjected to the differential crystallization treatment was cut in a size of about 1 mm × 1 mm. The cut film piece was bonded by an adhesive to the end surface of an elongated cylindrical wooden rod. The rod was then covered by paraffin (melting point about 60°C.), and the paraffin-covered film was cut by an ordinary rotary microtome to form film pieces about 5 μ thick successively. The film pieces cut from the surface layer of which degree of crystallization was intended to be measured were put in carbon tetrachloride to dissolve the paraffin. The density of the cut film was measured by the density gradient tube method. The degree of crystallization was calculated by the following equation.

$$\text{Degree of crystallization} = \frac{1/\rho_a - 1/\rho}{1/\rho_a - 1/\rho_c}$$

wherein
$\rho$ is the density of the film (g/cm$^3$),
$\rho_a$ is the density of completely amorphous state,
$\rho_c$ is the density of theoretically complete crystalline state, (In the case of polyethylene terephthalate, $\rho_a=1.335$ g/cm$^3$, and $\rho_c=1.445$ g/cm$^3$.)

EXAMPLE 1

This Example shows that when the differential crystallization treatment is not performed, the wind up of the film is extremely difficult.

Polyethylene terephthalate was prepared using 40 m-mol% of manganese acetate, 20 m-mol% antimony trioxide and 40 m-mol% of phosphorous acid based on dimethyl terephthalate. The polyethylene terephthalate was extruded into an unstretched film, and stretched 3.6X in the longitudinal direction and then 3.7X in the transverse direction, followed by heat-setting at 200°C. to prepare a 25 μm thick film. Since the film underwent blocking, it was extremely difficult to wind it up. The roll of the film becomes polygonal in shape, and creases occurred. The film was useless as a base film of a magnetic recording material. It had a coefficient of friction of at least 4.0 both in the static and kinematic conditions. Both surfaces of the film were completely flat and smooth.

EXAMPLE 2

The same polyethylene terephthalate as obtained in Example 1 was extruded into an unstretched film. The film was passed over a roll coated with a polytetrafluoroethylene resin on its surface and maintained at 110°C. via guide rolls, and hot air held at 250°C. was blown against the film at the point of contact with the heated roll thereby to subject the film to differential crystalization treatment. By varying the speed of passing the film, the treating time was changed, and thereby the extent of crystallization was also changed. After this crystallization treatment, the film was stretched simultaneously both in the longitudinal and transverse directions at a stretch ratio of 3.5X. The stretched film was heat-treated at 200°C. (Runs Nos. 1–4).

For comparison, the above procedure was repeated except that the film was heat-treated for 90 seconds in air at 120°C. instead of subjecting it to the differential crystallization treatment using the heated roll. Since this heat-treatment was effected uniformly on both surfaces, the method was not in accordance with the present invention. (Run No. 5).

The results are shown in Table 1. In Run No. 1, the crystallization treatment was not effected at all, and in Run No. 2, the difference in the degree of crystallization as a result of the differential crystallization treatment was less than 5 %. Both Runs 1 and 2 are outside the scope of the present invention.

Table 1

| Run Nos. | Time required for the crystallization treatment (seconds) | Degree of crystallization after the crystallization treatment but before stretching (%) Surface A | Surface B | Surface conditions of the stretched film Surface A | Surface B | Coefficient of static friction of the stretched film | |
|---|---|---|---|---|---|---|---|
| 1 (control) | — | 6 | 6 | Smooth | Smooth | ≥ | 4.0 |
| 2 (control) | 5 | 9 | 6 | Slightly rugged | Smooth | A—A  A—B  B—B | 1.5  3.1  >4.0 |
| 3 | 10 | 14 | 7 | Rugged | Smooth | A—A  A—B  B—B | 0.6  0.9  4.0 |
| 4 | 15 | 26 | 7 | Greatly rugged | Smooth | A—A  A—B  B—B | 0.4  0.6  >4.0 |
| 5 | 90 at | 26 | 26 | Greatly | Greatly | | 0.4 |

Table 1-continued

| Run Nos. | Time required for the crystallization treatment (seconds) | Degree of crystallization after the crystallization treatment but before stretching (%) | | Surface conditions of the stretched film | | Coefficient of static friction of the stretched film |
|---|---|---|---|---|---|---|
| | | Surface A | Surface B | Surface A | Surface B | |
| (control) | 120°C. | | | rugged | rugged | |

In Table 1, A—A means the coefficient of friction between surfaces A. Likewise, A–B means the coefficient of friction between surface A and surface B, and B—B, the coefficient of friction between surfaces B.

The samples obtained in Runs Nos. 1 and 2 had poor slipperiness. The sample obtained in Run No. 5 had good slipperiness, but was heavily rugged on the surface.

EXAMPLE 3

The same polyethylene terephthalate as prepared in Example 1 was extruded into an unstretched film. Steam at 100°C. was blown against one surface of this unstretched film for 60 seconds to effect the differential crystallization treatment (Run No. 1).

The unstretched film was subjected to the differential crystallization treatment by contacting acetone as a crystallization promotor with one surface of the film for one second. (Run No. 2).

Each of the samples obtained in Runs Nos. 1 and 2 was then stretched in the longitudinal and transverse directions consecutively and heat set under the same conditions as set forth in Example 1 to form a 25 μm thick film.

Also, the unstretched film obtained above was stretched 3.6X in the longitudinal direction, and passed over a water cooled drum at 30°C., and superheated steam at 150°C. was blown against the film from above for about one second to effect the differential crystallization treatment. Then, the film was stretched 3.7X in the transverse direction and heat-set at 200°C. to form a 25 μm thick film. (Run No. 3).

Furthermore, the unstretched film obtained above was passed over a heated roll coated with polytetrafluoroethylene and held at 110°C. at the surface, and superheated steam at 300°C. was blown against the film on the contact area between the film and the heated roll. After this 5-second differential crystallization treatment, the film was stretched successively in the longitudinal and transverse directions and then heatset under the same conditions as in Runs Nos. 1 and 2 to form a 25 μm thick film. (Run No. 4).

On the smooth surface (surface B having a lower degree of crystallization) of each of the four films prepared above, a magnetic layer consisting of acicular γ-type ferric oxide and a binder composed of a vinyl acetate/vinyl chloride copolymer) was coated in a thickness of 5 μm to produce a magnetic recording tape. The properties of the base films, and the properties (running property and dropout) of the magnetic recording tapes obtained were measured, and the results are shown in Table 2. Furthermore, Table 2 shows the results of a similar experiment which was conducted using a film (25 μm thick) which was prepared in the same way as above except that 0.1 % by weight of kaolin having an average particle diameter of 1 μm as a lubricant was incorporated and the differential crystallization treatment was not performed (Run No. 5).

Table 2

| Run No. | Degree of crystallization of the film after the crystallization treatment and before stretching (%) | | Properties of the base film | | | Properties of the magnetic tape | |
|---|---|---|---|---|---|---|---|
| | Surface A | Surface B | State of wind up | Coefficient of friction | | Surface conditions | Dropout | Running property |
| 1 | 23 | 7 | Good | A—A  0.4<br>A—B  0.5<br>B—B  >4.0 | | Surface A rugged but surface B smooth | 2 | Good |
| 2 | 36 | 6 | Good | A—A  0.4<br>A—B  0.5<br>B—B  >4.0 | | " | 3 | Good |
| 3 | 38 | 24 | Good | A—A  0.4<br>A—B  0.4<br>B—B  0.5 | | " | 6 | Good |
| 4 | 35 | 8 | Good | A—A  0.4<br>A—B  0.5<br>B—B  >4.0 | | " | 3 | Good |
| 5 (control) | 6 | 6 | Good | A—A  0.4<br>A—B  0.4<br>B—B  0.4 | | Both surfaces rugged | 21 | Good |

The film having kaolin incorporated therein had good slipperiness and could be wound up in good condition, and the magnetic tape made therefrom had good running property. But since both surfaces of the film became rugged, it could not be free from a marked increase in dropout.

EXAMPLE 4

An unstretched film of polyethylene-2,6-naphthalate not containing fine particles of a lubricant was subjected instantaneously to the differential crystallization treatment using chloroform at room temperature, and then stretched 3.5X and 3.5X simultaneously in two directions to form a 12 μm thick film (Run No. 1).

Also, the film after the differential crystallization treatment was stretched 4.0X uniaxially to form a 12 μm thick film (Run No. 2).

Run No. 1 was repeated except the differential crystallization treatment was not performed (Run No. 3).

The same magnetic layer was coated on each of the samples obtained in Runs Nos. 1, 2 and 3.

The measurements of properties were made in the same way as in Example 3, and the results obtained are shown in Table. 3.

Table 3

| Run No. | Degree of crystallization of the film after the crystallization treatment and before stretching (%) | | State of wind up | Properties of the base film | | Properties of the magnetic tape | |
|---|---|---|---|---|---|---|---|
| | Surface A | Surface B | | Coefficient of friction | Surface conditions | Dropout | Running property |
| 1 | 37 | 4 | Good | A—A 0.4<br>A—B 0.5<br>B—B >4.0 | Surface A rugged but surface B smooth | 1 | Good |
| 2 | 37 | 4 | Good | A—A 0.4<br>A—B 0.5<br>B—B >4.0 | " | 2 | Good |
| 3 (control) | 4 | 4 | Poor (creases occurred) | A—A >0.4<br>A—B >0.4<br>B—B >0.4 | Both surfaces smooth | Because of many creases, the film was difficult to handle and process into a magnetic tape | |

What we claim is:

1. A magnetic recording material comprising a base film of a crystalline polymer and a magnetic layer coated on a first surface of said base film, the first surface of said base film on which the magnetic layer is coated being sufficiently smooth to prevent the occurrence of dropout, the second surface of the film being finely rugged to impart good running property to the base film, such fine ruggedness resulting from
differentially crystallizing said base film such that said second surface has at least 5 percent higher degree of crystallization than said first surface and thereafter stretching said film in at least one direction whereby said second surface, having the higher degree of crystallization, becomes finely rugged, such good running property resulting solely from said fine ruggedness of said second surface,
said base film not containing fine particles in an amount to impart noticeable ruggedness or dropout to the film.

2. The magnetic recording material of claim 1 which has a thickness of 3 – 100 μm.

3. The magnetic recording material of claim 1 wherein said crystalline polymer is selected from the group consisting of polyethylene terephthalate, polymethylene terephthalate, polymethylene-2,6-naphthalate, polyamides and polypropylene.

4. A magnetic recording material comprising a base film of a crystalline polymer and a magnetic layer coated on a first surface of said base film, the first surface of said base film on which the magnetic layer is coated being sufficiently smooth to prevent the occurrence of dropout, the second surface of the film being finely rugged to impart good running property to the base film, such fine ruggedness resulting from
stretching first the base film in one direction, then differentially crystallizing the stretched base film such that said second surface has at least 5 percent higher degree of crystallization than said first surface, and thereafter stretching the crystallized base film in a direction at right angles to the direction of the first stretching whereby the second surface, having the higher degree of crystallization, becomes finely rugged, such good running property resulting solely from said fine ruggedness of said second surface,
said base film not containing fine particles in an amount to impart noticeable ruggedness or dropout to the film.

5. The magnetic recording material of claim 4 wherein said crystalline polymer is selected from the group consisting of polyethylene terephthalate, polymethylene terephthalate, polymethylene-2,6-naphthalate, polyamides and polypropylene.

6. The magnetic recording material of claim 4 which has a thickness of 3–100 μm.

* * * * *